United States Patent
Waschke et al.

(10) Patent No.: US 9,477,494 B2
(45) Date of Patent: Oct. 25, 2016

(54) SYSTEM AND METHOD FOR RECONCILING DUPLICATE CONFIGURATION ITEMS IN A CONFIGURATION MANAGEMENT DATABASE

(75) Inventors: Marvin Waschke, Bellingham, WA (US); Steven Greenspan, Scotch Plains, NJ (US)

(73) Assignee: CA, Inc., New York, NY (US)

( * ) Notice: Subject to any disclaimer, the term of this patent is extended or adjusted under 35 U.S.C. 154(b) by 971 days.

(21) Appl. No.: 13/212,776

(22) Filed: Aug. 18, 2011

(65) Prior Publication Data
US 2013/0046739 A1     Feb. 21, 2013

(51) Int. Cl.
    *G06F 7/00*     (2006.01)
    *G06F 17/00*     (2006.01)
    *G06F 9/445*     (2006.01)
    *G06F 17/30*     (2006.01)

(52) U.S. Cl.
    CPC ..... *G06F 9/44505* (2013.01); *G06F 17/30067* (2013.01)

(58) Field of Classification Search
    CPC .............................................. G06F 17/30067
    See application file for complete search history.

(56) References Cited

U.S. PATENT DOCUMENTS

| | | | |
|---|---|---|---|
| 7,685,167 B2 | 3/2010 | Mueller | 707/200 |
| 2001/0047279 A1 | 11/2001 | Gargone | |
| 2006/0136585 A1 | 6/2006 | Mayfield et al. | 709/224 |
| 2006/0161879 A1* | 7/2006 | Lubrecht et al. | 717/101 |
| 2006/0271281 A1* | 11/2006 | Ahn et al. | 701/208 |
| 2007/0100712 A1* | 5/2007 | Kilpatrick et al. | 705/29 |
| 2007/0100892 A1* | 5/2007 | Kephart et al. | 707/200 |
| 2007/0143398 A1 | 6/2007 | Graham | |
| 2007/0198666 A1 | 8/2007 | Hoyes | |
| 2007/0283049 A1* | 12/2007 | Rakowski et al. | 709/246 |
| 2009/0030885 A1 | 1/2009 | DePasquale | |
| 2009/0060393 A1 | 3/2009 | Satoh | |
| 2009/0228526 A1 | 9/2009 | Wada et al. | 707/201 |
| 2009/0319932 A1 | 12/2009 | Robinson et al. | 715/771 |
| 2010/0161577 A1* | 6/2010 | Morozov | 707/705 |
| 2010/0169135 A1 | 7/2010 | Lepari | |

(Continued)

OTHER PUBLICATIONS

DMTF "Configuration management database (CMDB) federation specification", Apr. 22, 2010, Version 1.0.1, pp. 1-74.*

(Continued)

*Primary Examiner* — Loan T Nguyen
(74) *Attorney, Agent, or Firm* — Pillsbury Winthrop Shaw Pittman LLP (57) ABSTRACT

The system and method described herein may be used to reconcile duplicate configuration items in a configuration management database. In particular, corresponding properties that represent relationships with a trial configuration item and an existing configuration item may be compared to reconcile whether the trial configuration item corresponds to the existing configuration item and should therefore be combined with the existing configuration item, or alternatively whether the trial configuration item represents a new configuration item that can be added to the configuration management database. If comparing the properties associated with the trial configuration item and the existing configuration item results in an indeterminate outcome, a reconciliation engine may inspect a table stored directly on the trial configuration item and/or the existing configuration item to reconcile whether the trial configuration item and the existing configuration item are indeed different or identical.

20 Claims, 3 Drawing Sheets

(56) References Cited

U.S. PATENT DOCUMENTS

| | | | |
|---|---|---|---|
| 2010/0179945 A1* | 7/2010 | Rangarajan et al. | 707/694 |
| 2010/0293205 A1 | 11/2010 | Baker et al. | 707/812 |
| 2011/0029767 A1 | 2/2011 | Ayachitula et al. | 713/100 |
| 2011/0113092 A1* | 5/2011 | Rakowski et al. | 709/203 |
| 2011/0153558 A1* | 6/2011 | Tubman et al. | 707/609 |
| 2011/0202529 A1* | 8/2011 | Waschke | 707/737 |
| 2011/0231429 A1* | 9/2011 | Wada et al. | 707/769 |
| 2014/0025647 A1* | 1/2014 | Rangarajan | G06F 17/30371 707/691 |

OTHER PUBLICATIONS

BmcSoftware, article entitled "Maintain an Accurate CMBD through reconciliation" 2006.*

Technical White Paper: "Maintain an Accurate CMDB through Reconciliation", BMC Software, copyright 2005, 2009, No. 97561, 8 pages.

A SunView Software White Paper: CMDB: The Key to Infrastructure Visibility >> A Catalyst for Improving IT Service Management:, Mar. 2007, 12 pages.

Configuration Management Database (CMDB) Federation Specification, Document No. DSP0252, Version 1.0.0, Jun. 22, 2009, Distributed Management Task Force, Inc., 73 pages.

Schaaf, Thomas, et al., "Requirements and Recommendations for the Realization of a Configuration Management Database", *Proceedings of HPSUA 2007—14$^{th}$ HP Software University Association Workshop*, Jul. 2007, Munich, Germany, 6 pages.

* cited by examiner

SYSTEM AND METHOD FOR RECONCILING DUPLICATE CONFIGURATION ITEMS IN A CONFIGURATION MANAGEMENT DATABASE

FIELD OF THE INVENTION

The invention generally relates to a system and method for reconciling duplicate configuration items in a configuration management database, and in particular, to writing data that uniquely identifies a particular physical or logical resource directly to a configuration item that has an indeterminate status or a suspected duplicate configuration item to reconcile whether the indeterminate configuration item or the suspected duplicate configuration item already exists within the configuration management database.

BACKGROUND OF THE INVENTION

Many organizations use configuration management databases to organize information relating to information technology devices. In particular, configuration management databases typically include a repository that stores various configuration items to describe physical and logical information technology resources. For example, in principle, configuration items may represent software, hardware, documents, physical containers, virtual containers, people, or any other physical or logical information technology resource that an organization may seek to manage via the configuration management database. As such, to map or otherwise model an information technology infrastructure, many organizations use configuration management databases to catalog various configuration items that may exist within the infrastructure in addition to other information associated with the configuration items (e.g., technical details, ownership, relationships to other configuration items, etc.). Broadly speaking, a configuration item therefore refers to the basic structural unit that a configuration management system uses to manage configuration item life-cycles through various processes and management tools.

One important concern relating to configuration management databases involves federation, where different management applications may be permitted to add information to the configuration management database or multiple configuration management databases are combined into a federated configuration management database solution. In particular, every configuration item within a configuration management database would ideally be associated with one and only one unique identifier, but different management applications tend to vary in how strictly unique identifiers are maintained depending on their purpose. Moreover, even when a standalone management application associates each configuration item with one and only one unique identifier, duplicate configuration items can arise in federated configuration management databases that provide one repository shared across multiple management applications. For example, one management application may use an IP address to uniquely identify a configuration item that represents a networked computer, while another may use a purchase order number associated with the computer. In another example, a particular server may have more than one fully qualified domain name (FQDN), which could result in multiple configuration items being created to represent the different fully qualified domain names. Furthermore, these problems tend to be exacerbated in networks that use the Dynamic Host Configuration Protocol (DHCP) if a management application uses IP addresses to identify the configuration items (i.e., because the IP address can and typically does change every time that a computer accesses a network via DHCP). Thus, integrating multiple configuration management systems into a federated configuration management database can easily lead to duplicate configuration items and a misrepresentative map of the configuration item network.

Although efforts have been made to reconcile information added to a configuration management database during federation (e.g., to reduce duplicate configuration items and ensure that the information relating to a particular configuration item was added accurately), the massive amounts of information typically stored in configuration management databases tends to require substantial computing power to determine whether the added information relates to an existing configuration item or a new configuration item. In this context, reconciliation refers to determining whether information associated with a particular configuration items applies to a configuration item already present in a configuration management database or whether a new configuration items needs to be created. For example, if different configuration items claim to have the same identity, then the different configuration items refer to the same physical or logical resource. However, existing reconciliation implementations have often been criticized because they tend to be slow, erroneous, and require excessive manual intervention. Moreover, the reconciliation implementations that have been attempted to date usually rely on simple matching algorithms that choose certain attributes to compare between different objects and distinguish identity, but these algorithms tend to produce many false negatives and false positives, not to mention undecided cases that require expensive and time-consuming manual intervention. In fact, due to the difficulties involved in reconciling the information in configuration management databases, accurate reconciliation has frequently been cited as a significant obstacle to implementing a federated configuration management database because interrelationships could be missed and potential consequences associated therewith remain unnoticed.

SUMMARY OF THE INVENTION

According to one aspect of the invention, the system and method described herein may include various features that may be used to reconcile duplicate configuration items in a configuration management database. In particular, properties associated with a particular configuration item may be divided into various different classes that generally correspond to different relationships that the properties may have with the corresponding configuration item. As such, in one implementation, a particular property associated with the configuration item may then be compared to one or more properties associated with existing configuration items in the configuration management database, and different actions may be taken to reconcile the configuration item depending on the particular class associated with the property compared to the properties associated with the existing configuration items. For example, in response to the property associated with the configuration item matching one or more properties associated with an existing configuration item, information associated with the configuration item may be combined into the existing configuration item to avoid duplication. In contrast, if the property associated with the configuration item does not match any properties associated with the existing configuration items, a new configuration item may be created to represent the configuration item in the configuration management database.

According to one aspect of the invention, the system and method described herein may generally include a reconciliation engine to reconcile the duplicate configuration items in the configuration management database. In particular, the reconciliation engine may compare a property associated with a trial configuration item to properties associated with one or more configuration items that already exist in the configuration management database, wherein different properties associated with the trial configuration item and/or the existing configuration items may be divided into different classes to distinguish and more accurately reconcile information associated with the trial configuration item and/or the existing configuration items. For example, in response to a management application attempting to add the trial configuration item to the configuration management database, the reconciliation engine may reconcile the trial configuration item with the existing configuration items to determine whether the trial configuration item matches any existing configuration items in the configuration management database, or whether the trial configuration item can be added to the configuration management database because no existing configuration items match the trial configuration item. Alternatively, if the reconciliation engine cannot accurately distinguish whether the trial configuration item matches any existing configuration items, an exception may be generated to indicate that the trial configuration item has an indeterminate status (i.e., the trial configuration item may be unique or match an existing configuration item).

According to one aspect of the invention, the reconciliation engine may then generate a "final reconciliation conclusion" to indicate the uniqueness associated with the trial configuration item vis-à-vis the existing configuration items, wherein the final reconciliation conclusion may generally refer to possible outcomes that may result from the reconciliation engine attempting to reconcile the trial configuration item with the existing configuration items in the configuration management database. For example, the final reconciliation conclusion may indicate that the trial configuration item corresponds to an existing configuration item in response to the trial configuration item matching the existing configuration item and then combine the trial configuration item with the matching existing configuration item because the trial configuration item and the existing configuration item represent the same physical or logical resource. On the other hand, if the trial configuration item does not match any existing configuration items, the reconciliation engine may create a new configuration item to represent the trial configuration item and add the new configuration item to the configuration management database because the trial configuration item represents a new physical or logical resource different from every physical or logical resource that the existing configuration items already represent. However, if the trial configuration item cannot be suitably reconciled with the existing configuration items, the final reconciliation conclusion may be an indeterminate exception indicating that the uniqueness associated with the trial configuration item remains unknown. As such, in one implementation, automated and/or manual intervention may then be initiated in an attempt to resolve the uniqueness associated with the trial configuration item that resulted in the indeterminate exception.

According to one aspect of the invention, in response to generating any indeterminate exceptions indicating that properties associated with the trial configuration item could not be used to accurately distinguish whether the trial configuration item corresponds to an existing configuration item or represents a new configuration item, the reconciliation engine may attempt to reconcile the uniqueness associated with the trial configuration item. Alternatively (or additionally), the reconciliation engine may attempt to reconcile the uniqueness associated with the trial configuration item in response to a manual or automated inquiry about the identities associated with two or more configuration items, which may include the trial configuration item and/or the existing configuration items. As such, In one implementation, the reconciliation engine may then initiate the automated intervention described herein to distinguish whether the two or more configuration items are identical or different, wherein the intervention may be performed to reconcile any suitable configuration items that permit reading and writing to well-defined data files associated with physical or logical resources that the configuration items represent. In particular, the system and method described herein may define an object identifier that can be inserted into a table to uniquely identify a particular physical or logical resource represented with a particular configuration item, wherein the table may be stored directly on the configuration item rather than the configuration management database or another central repository shared across multiple management applications. In one implementation, the object identifier (hereinafter "CI.OID") may have a unique format that the reconciliation engine can identify to distinguish the CI.OID from identifiers that relate to other properties associated with the configuration item.

According to one aspect of the invention, in order to distinguish whether two or more configuration items are identical or different, the reconciliation engine may initially inspect the table stored on one of the configuration items to determine whether or not the table includes a CI.OID. For example, in response to the reconciliation engine finding an existing CI.OID in the inspected table stored on the configuration item, the reconciliation engine may determine that the configuration item has been previously identified in the configuration management database. Alternatively, if the reconciliation engine does not find an existing CI.OID in the table, the reconciliation engine may write a new CI.OID to the table. In one implementation, the reconciliation engine can then inspect the tables stored on any other configuration items to determine if the tables stored thereon have a CI.OID that match the new CI.OID, wherein the reconciliation engine may determine that any configuration items having the new CI.OID stored in their tables are identical to the configuration item associated with the newly written CI.OID (i.e., because the tables associated with the different configuration items are in fact the same logical table and stored on the same physical or logical resource, whereby the configuration items can be combined because they represent the same physical or logical resource). As such, the reconciliation engine may incrementally write unique CI.OID, to each configuration item previously having an indeterminate status, wherein the indeterminate exceptions may decrease in response to accruing the number of configuration items that contain a CI.OID. Moreover, in one implementation, the CI.OIDs may be written to each and every physical or logical resource discovered during an associated with the configuration management database to ensure that all configuration items referenced therein can be suitably reconciled, or the CI.OIDs may be written to each and every configuration items in an existing configuration management database installation to remedy any indeterminate exceptions that resulted from management applications using different mechanisms to identify the configuration items referenced therein.

According to one aspect of the invention, the system and method described herein may be advantageously used in certain use cases to distinguish whether different configuration items are indeed identical. For example, one use case may relate to laptop computers, which typically have different network addresses respectively associated with wired and wireless network interfaces. As such, if a management application uses network addresses to identify configuration items, one laptop computer may be represented with two configuration items (i.e., one corresponding to the wired network address and another to the wireless network address). In one implementation, to reconcile whether the two configuration items are indeed different or identical, the reconciliation engine may write a token to one of the two configuration items suspected to represent the same laptop computer and then attempt to read the token from the other configuration item. Accordingly, the reconciliation engine may determine that the two configuration items are identical if the token resides on the other configuration item, or alternatively determine that the two configuration items are different if the token does not reside on the other configuration item, whereby the reconciliation engine may distinguish whether the two configuration items are different or identical.

Other objects and advantages of the invention will be apparent to those skilled in the art based on the following drawings and detailed description.

DETAILED DESCRIPTION

Figure 1:
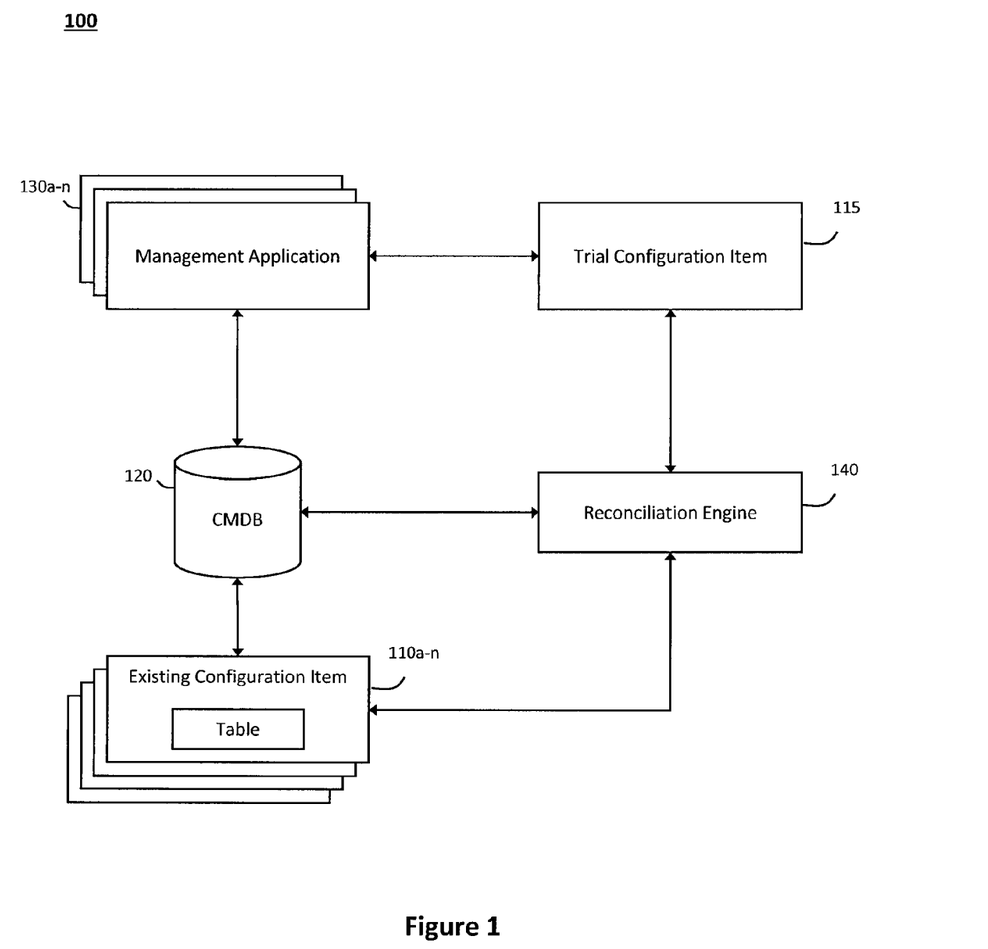
FIG. 1 illustrates an exemplary system to reconcile duplicate configuration items in a configuration management database, according to one aspect of the invention.

According to one aspect of the invention, FIG. 1 illustrates an exemplary system 100 to reconcile duplicate configuration items 110a-n in a configuration management database 120. In particular, the system 100 may generally include a reconciliation engine 140 to compare a property associated with a trial configuration item 115 to properties associated with one or more configuration items 110a-n that already exist in the configuration management database 120. For example, in one implementation, the reconciliation engine 140 may utilize different properties associated with the trial configuration item 115 and/or the existing configuration items 110a-n, which can be divided in different classes to distinguish and more accurately reconcile information associated with the trial configuration item 115 and/or the existing configuration items 110a-n. In particular, in response to a management application 130 attempting to add the trial configuration item 115 to the configuration management database 120, the reconciliation engine 140 may be invoked to compare the property associated with the trial configuration item 115 with properties associated with the existing configuration items 110a-n. For example, in one implementation, the configuration management database 120 may include a federated repository shared across multiple management applications 130a-n, which may vary in how strictly unique identifiers associated with configuration items 110 created thereby are maintained. Consequently, because the multiple management applications 130a-n may share the configuration management database 120, duplicative configuration items 110a-n that represent the same physical or logical resource can potentially exist in the configuration management database 120.

Accordingly, in response to a particular management application 130 initiating a request to add the trial configuration item 115 to the configuration management database 120, the reconciliation engine 140 may be invoked to reconcile the trial configuration item 115 with the existing configuration items 110a-n in the configuration management database 120. For example, to reconcile the trial configuration item 115, the reconciliation engine 140 may determine whether the trial configuration item 115 matches any existing configuration items 110a-n in the configuration management database 120, or whether the trial configuration item 115 can be added to the configuration management database 120 because no existing configuration items 110a-n match the trial configuration item 115. Alternatively, if the reconciliation engine 115 cannot accurately distinguish whether the trial configuration item 115 matches any existing configuration items 110a-n, the reconciliation may generate an exception to indicate that the trial configuration item 115 has an indeterminate status (i.e., the trial configuration item 115 may be unique or match an existing configuration item 110, but the correct status cannot be accurately assessed). Accordingly, in one implementation, the reconciliation engine 140 may generate a "final reconciliation conclusion" to indicate the uniqueness associated with the trial configuration item 115 vis-à-vis the existing configuration items 110a-n, wherein as used herein, the term "final reconciliation conclusion" may generally refer to the possible outcomes that may result from the reconciliation engine 140 attempting to reconcile the trial configuration item 115 with the existing configuration items 110a-n in the configuration management database 120.

For example, in one implementation, the final reconciliation conclusion may indicate that the trial configuration item 115 corresponds to the existing configuration item 110 in response to the reconciliation engine 140 determining that the trial configuration item 115 matches an existing configuration item 110, wherein the reconciliation engine 140 may then combine the trial configuration item 115 with the matching existing configuration item 110 (i.e., because the trial configuration item 115 and the existing configuration item 110 represent the same physical or logical resource). On the other hand, in response to the reconciliation engine 140 determining that the trial configuration item 115 does not match any existing configuration items 110a-n in the configuration management database 120, the reconciliation engine 140 may create a new configuration item 110 to represent the trial configuration item 115 and add the new configuration item 110 to the configuration management database 120 (i.e., because the trial configuration item 115 represents a new physical or logical resource different from every physical or logical resource that the existing configuration items 110a-n already represent in the configuration management database 120). However, if the reconciliation engine 140 cannot suitably reconcile the trial configuration item 115 with the existing configuration items 110a-n, the final reconciliation conclusion may include an indeterminate exception to indicate that the uniqueness associated with the trial configuration item 115 remains unknown. As such, in one implementation, automated and/or manual intervention may then be initiated in an attempt to resolve the uniqueness associated with the trial configuration item 115 that resulted in the indeterminate exception, as will be described in further detail below.

In one implementation, to reconcile the trial configuration item 115 with the existing configuration items 110a-n, the reconciliation engine 140 may generally classify the property associated with the trial configuration item 115 based on a relationship between the property and the trial configuration item 115. In particular, in one implementation, the system 100 may define various classes to represent relationships that certain properties may have with trial configuration items 115 and/or existing configuration items 110, wherein the various classes may include classes to represent one-to-one relationships, many-to-one relationships, one-to-many relationships, or any other suitable relationship with trial configuration items 115 and/or existing configuration items 110 associated therewith. For example, in one implementation, the property associated with the trial configuration item 115 may be classified into a unique identifier class that represents one-to-one relationships, a general identifier class that represents many-to-one relationships, or a differentiator class that represents one-to-many relationships, whereby any references provided herein to a "unique identifier," a "general identifier," or a "differentiator" may respectively correspond to a property classified into the unique identifier class, the general identifier class, or the differentiator class. Further, in one implementation, any unique identifier property, general identifier property, or differentiator property may include a type that represents the particular relationship between the property and the associated trial configuration item 115 and/or existing configuration item 110.

For example, in one implementation, the type associated with a property in the unique identifier class may represent a particular one-to-one relationship with a configuration item 110 (i.e., the configuration item 110 can only be associated with one unique identifier have a particular type, and the associated unique identifier corresponds only to that configuration item 110). However, in one implementation, one or more configuration items 110 can be associated with multiple unique identifiers, provided that the multiple unique identifiers have different types. For example, one unique identifier type may include an asset tag that can be written to a physical or logical resource (e.g., data that an asset manager can physically write to a device), while other unique identifier types may include a make-model-serial number unique to a particular resource, an employee number that an organization assigns to identify a human resource, or any other suitable data type that can uniquely identify one and only one physical or logical resource. As such, certain configuration items 110 may have multiple unique identifiers with different types, but no configuration item 110 may have multiple unique identifiers with the same type. Further, in one implementation, the type associated with a general identifier may represent a particular many-to-one relationship with a configuration item 110 (i.e., the configuration item 110 can have multiple general identifiers with the same type, although any particular general identifier only corresponds to that configuration item 110). For example, one general identifier type may include a Media Access Control (MAC) address associated with a network device, which may potentially have multiple MAC addresses associated with different network interfaces (e.g., a wired network interface and a wireless network interface). However, each MAC address corresponds to one and only one network interface on the device. Moreover, the type associated with a differentiator property may represent a particular one-to-many relationship with a configuration item 110 (i.e., the configuration item 110 can only have one differentiator with a particular type, although multiple configuration items 110 can have the same differentiator). For example, the differentiator type may include a purchase date common to various physical or logical resources, wherein each physical or logical resource can only have one purchase date.

In one implementation, in response to suitably classifying the property associated with the trial configuration item 115, the reconciliation engine 140 may then compare the classified property to corresponding properties associated with one or more existing configuration items 110a-n, wherein the properties associated with the trial configuration item 115 and such existing configuration items 110 have the same type. In one implementation, possible outcomes that may be produced in response to the reconciliation engine 140 comparing the properties associated with the trial configuration item 115 and the existing configuration items 110 may include a match, a non-match, or a null. In particular, the match outcome may generally indicate that the property associated with the trial configuration item 115 and the property associated with a particular existing configuration item 110 are the same (e.g., if the trial configuration item 115 and the existing configuration item 110 both have the "456-AT-2893" to represent an asset tag property). In contrast, the non-match outcome may indicate that the properties associated with the trial configuration item 115 and the existing configuration item 110 are different (e.g., if the existing configuration item 110 has the string "456-UR-5546" to represent the asset tag property). However, in certain situations, the properties associated with the trial configuration item 115 and the existing configuration item 110 may not be comparable (e.g., if the corresponding property associated with the existing configuration item 110 has an empty field), in which case the null outcome may be generated to indicate that the property associated with the trial configuration item 115 could not be compared to the corresponding property associated with the existing configuration item 110.

Accordingly, in one implementation, the reconciliation engine 140 may compare one or more properties associated with the trial configuration item 115 to properties associated with one or more existing configuration items 110 depending on the classification and type that the properties associated with the trial configuration item 115 have. In particular, any existing configuration items 110 that have corresponding properties with the same classification and type may be identified, and the reconciliation engine 140 may then compare the properties associated with the trial configuration item 115 to the corresponding properties associated with the identified existing configuration items 110 in an attempt to distinguish the uniqueness that the trial configuration item 115 has vis-à-vis the identified existing configuration items 110. For example, the reconciliation engine 140 may determine that the trial configuration item 115 and a particular existing configuration item 110 are the same if a unique identifier associated with the trial configuration item 115 matches a unique identifier associated with any existing configuration item 110, or alternatively if the trial configuration item 115 and any existing configuration item 110 have the same general identifier. On the other hand, the reconciliation engine 140 may determine that the trial configuration item 115 represents a new configuration item 110 that can be added to the configuration management database 120 if comparing the unique identifier associated with the trial configuration item 115 to every existing configuration item 110 having a corresponding unique identifier results in non-match outcomes with respect to all such existing configuration items 110, or alternatively if comparing a differentiator associated with the trial configuration item 115 to every existing configuration item 110 having a corresponding differentiator results in non-match outcomes with respect to all such existing configuration items 110.

However, the reconciliation engine 140 may generate an indeterminate exception if the unique identifier associated with the trial configuration item 115 results in a null comparison outcome with respect to any existing configuration item 110 (i.e., because the reconciliation engine 140 cannot accurately distinguish whether the trial configuration item 115 and the existing configuration item 110 have the same or different unique identifiers). Alternatively (or additionally), the reconciliation engine 140 may generate the indeterminate exception if the general identifier associated with the trial configuration item 115 only results in non-match or null outcomes with respect to all existing configuration items 110 (i.e., because the same resource can have multiple general identifiers, a non-match outcome provides no information to indicate whether the trial configuration item 115 and an existing configuration item 110 are different, nor does the null outcome provide any such information). Further still, the reconciliation engine 140 may generate the indeterminate exception if comparing the differentiator identifier associated with the trial configuration item 115 results in a match or null outcome with respect to any existing configuration item 110 (i.e., because different resources can have the same differentiator, a match outcome provides no information to indicate whether the trial configuration item 115 and an existing configuration item 110 are the same or different, nor does the null outcome provide any such information).

In one implementation, as noted above, the reconciliation engine 140 may initiate automated intervention in an attempt to reconcile the uniqueness associated with the trial configuration item 115 in response to generating an indeterminate exception indicating that any unique identifiers, general identifiers, and/or differentiators associated with the trial configuration item 115 could not accurately distinguish whether the trial configuration item 115 corresponds to an existing configuration item 110 or represents a new configuration item 110 that can be added to the configuration management database 120. In one implementation, the reconciliation engine 140 may alternatively (or additionally) attempt to reconcile the uniqueness associated with the trial configuration item 115 in response to receiving a manual or automated inquiry about the identities associated with two or more configuration items, which may include the trial configuration item 115 and/or the existing configuration items 110. Accordingly, to simplify the discussion that will be provided herein relating to the automated intervention that the reconciliation engine 140 may initiate to distinguish the identities associated with two or more configuration items, any subsequent references to the general term "configuration item" 110 shall be understood to refer to a trial configuration item 115 and/or an existing configuration item 110.

In one implementation, as noted above, the reconciliation engine 140 may generally initiate the automated intervention described herein to distinguish whether two or more configuration items 110 are identical or different, wherein the intervention may be performed to reconcile any suitable configuration items 110 that allow administrative services to have read and write permissions to well-defined data files associated with physical or logical resources that the configuration items 110 represent. In particular, the reconciliation engine 140 may define an Object Identifier (OID) that can be inserted into a table (e.g., a Management Information Base table) to uniquely identify a particular physical or logical resource represented with a particular configuration item 110, wherein the table may be stored directly on the configuration item 110 rather than the configuration management database 120 or another central repository shared across multiple management applications 130a-n. As such, in one implementation, the Object Identifier (hereinafter "CI.OID") may have a unique format that the reconciliation engine 140 can identify to distinguish the CI.OID from identifiers that relate to other properties associated with the configuration item 110 (e.g., the unique identifiers, general identifiers, and/or differentiators described above).

In one implementation, to distinguish whether two or more configuration items 110 are identical or different, the reconciliation engine 140 may initially inspect the table stored on one of the configuration items 110 to determine whether or not the table includes a CI.OID. For example, if the system 100 uses a Management Information Base (MIB) table to store the CI.OID, the reconciliation engine 140 may use the Simple Network Management Protocol (SNMP) to remotely access data stored in the MIB table. In response to the reconciliation engine 140 finding that the inspected table stored on the configuration item 110 has an existing CI.OID, the reconciliation engine 140 may determine that the configuration item 110 has been previously identified in the federated configuration management database 120. Alternatively, if the reconciliation engine 140 does not find an existing CI.OID in the inspected table, the reconciliation engine 140 may then write a new CI.OID to the table (e.g., using SNMP). In one implementation, the configuration item 110 may still have an indeterminate status following the reconciliation engine 140 writing the new CI.OID to the table. However, the reconciliation engine 140 can then inspect the tables stored on any other configuration items 110 to determine if the tables stored on any such configuration items 110 match the new CI.OID, wherein the reconciliation engine 140 may determine that any configuration items 110 that have the new CI.OID stored in their tables are identical to the configuration item 110 having the table where the new CI.OID was previously written (i.e., because the tables associated with the different configuration items 110 are in fact the same logical table, whereby the configuration items 110 can be combined because they represent the same physical or logical resource).

As such, in one implementation, the reconciliation engine 140 may incrementally write unique CI.OIDs to each configuration item 110 that previously had an indeterminate status, wherein the indeterminate exceptions may decrease as the number of configuration items 110 that contain a CI.OID accrues. Additionally, in one implementation, an administrator or other suitable user can manually test hypotheses about the identities associated with different configuration items 110 using the techniques described above (e.g., submitting a request to the 140 that identifies two or more configuration items 110). Moreover, in one implementation, the CI.OIDs may be written to each and every physical or logical resource discovered during an installation associated with the configuration management database 120 to ensure that all configuration items 110 referenced therein can be suitably reconciled, or alternatively the CI.OIDs may be written to each and every configuration items 110 in an existing configuration management database 120 installation to remedy any indeterminate exceptions that resulted from management applications 130a-n using different mechanisms to identify the configuration items 110 referenced therein.

However, in one implementation, writing the CI.OIDs to the configuration items 110 may be limited to configuration items connected to a network and having suitably reliable writing mechanisms. In particular, any resources that do not permit read and/or write access, or that lack reliable read and/or write mechanisms, may compromise the effectiveness that the CI.OIDs have to distinguish the configuration items 110 (e.g., if network addresses are identical or have some identical parts, the reliability associated with writing to such network addresses may be compromised, and consequently, the reliability associated with the CI.OIDs may be compromised). In contrast, certain use cases may advantageously use different network addresses to determine whether different configuration items 110 are indeed identical. For example, laptop computers typically have one network address associated with a wired network interface and another network address associated with a wireless network interface. As such, if a management application 130 uses network addresses to identify configuration items 110, one laptop computer may be represented with two configuration items 110 (i.e., one corresponding to the wired network address and another corresponding to the wireless network address). Continuing this example, to reconcile whether the two configuration items 110 are different or identical, the reconciliation engine 140 may write a token to one of the two configuration items 110 suspected to represent the same laptop computer (e.g., a file may be uploaded to the configuration item 110 via File Transfer Protocol, data may be written to an SNMP MIB comment field, etc.). The reconciliation engine 140 may then attempt to read the token from the other configuration item 110, whereby the two configuration items 110 are identical if the token resides on the other configuration item 110 or different if the token does not reside on the other configuration item 110. Accordingly, the reconciliation engine 140 may be configured to perform various tests to distinguish whether configuration items 110 having certain well-defined properties are different or identical (e.g., any configuration items 110 that have identical system names and different MAC addresses, IP addresses, or DNS names).

Figure 2:
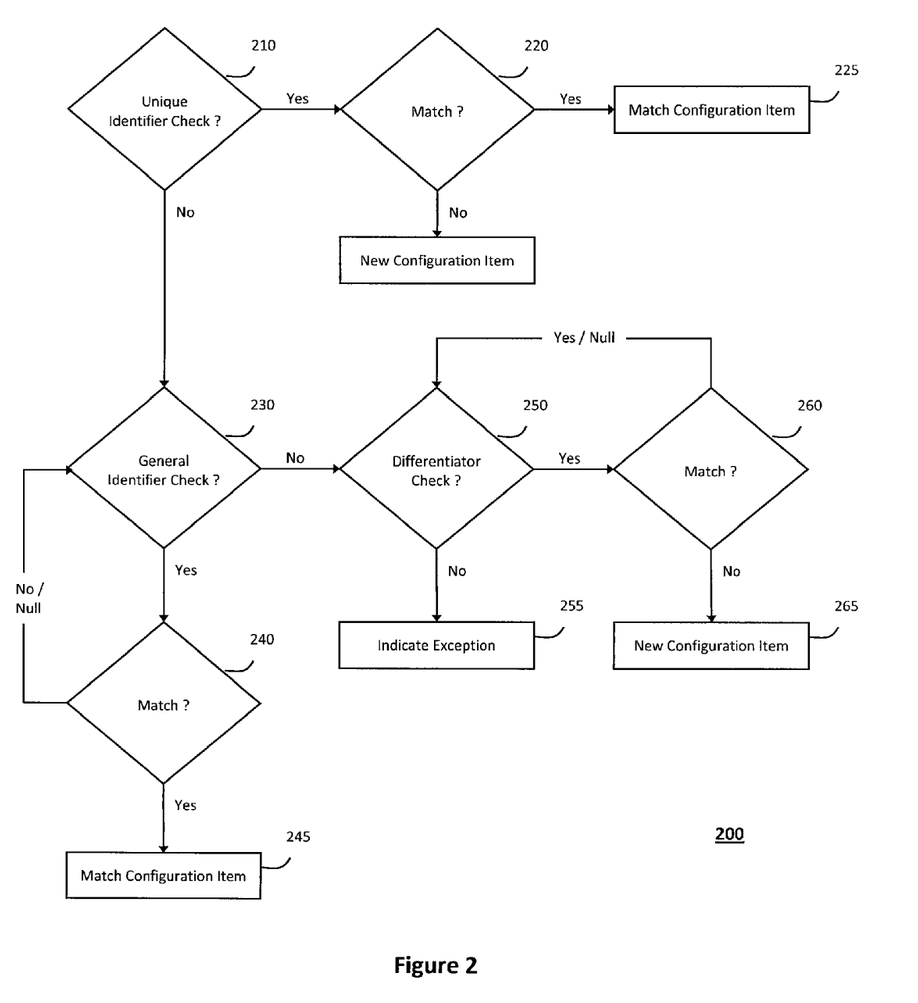
FIG. 2 illustrates an exemplary method to generate final reconciliation conclusions that describe relationships between a trial configuration item and existing configuration items in a configuration management database, according to one aspect of the invention.

According to one aspect of the invention, FIG. 2 illustrates an exemplary method 200 to generate final reconciliation conclusions that describe relationships between a trial configuration item and one or more configuration items that already exist in a configuration management database. For example, in one implementation, the method 200 may be initiated in an operation 210, which includes determining the type associated with a trial configuration item property compared to a corresponding existing configuration item property. In particular, in response to operation 210 determining that the property compared between the trial configuration item and the existing configuration item has the unique identifier type, an operation 220 may include determining whether the unique identifiers associated with the trial configuration item and the existing configuration item match. In response to determining that the unique identifiers associated with the trial configuration item and the existing configuration item indeed match, an operation 225 may generate a final reconciliation conclusion to indicate that the trial configuration item matches the existing configuration item because the unique identifier represents a one-to-one relationship with an associated configuration item (e.g., matching make-model-serial numbers indicate that the trial configuration item and the existing configuration item are the same). Alternatively, in response to the unique identifiers compared in operation 220 resulting in a non-match outcome, the final reconciliation conclusion may indicate that the trial configuration item and the existing configuration item compared thereto are different (e.g., different make-model-serial numbers indicate that the trial configuration item and the existing configuration item are different).

Accordingly, in one implementation, the financial reconciliation conclusion may indicate that the trial configuration item represents a new configuration item in response to the unique identifier compared in operation 220 resulting in non-match outcomes with respect to the corresponding unique identifiers associated with all existing configuration items, wherein a new configuration item representing the trial configuration item may then be added to the configuration management database. However, in response to the comparison between the unique identifier associated with the trial configuration item and the existing configuration item resulting in a null outcome, the unique identifier property may then be compared to the unique identifiers associated with additional existing configuration items to determine if any other unique identifiers match the unique identifier associated with the trial configuration item. Accordingly, if operation 220 results in a determination that the unique identifier associated with the trial configuration item does not match the unique identifiers associated with any existing configuration items but one or more null outcomes were encountered, operation 220 may provide no information relating to the uniqueness associated with the trial configuration item (i.e., because one null outcome provides no information relating to the relationship between the trial configuration item and the existing configuration item that resulted in the null outcome, whereby whether the trial configuration item and that existing configuration item are the same or different cannot be determined).

In one implementation, in response to determining that the property compared between the trial configuration item and the existing configuration item does not have the unique identifier type, an operation 230 may determine whether the property has the general identifier type. As such, in response to determining that the property has the general identifier type, the final reconciliation conclusion may be generated in an operation 240 to indicate that the trial configuration item matches an existing configuration item in response to the general identifier comparison performed in operation 240 resulting in a match outcome (e.g., if the trial configuration item and the existing configuration item have matching MAC addresses, the trial configuration item and the existing configuration item are the same). Alternatively, in response to the comparison between the general identifier associated with the trial configuration item and the general identifier associated with an existing configuration item resulting in a non-match outcome or a null outcome, operation 240 may provide no information relating to the uniqueness that the trial configuration item has with respect to the existing configuration item (e.g., because one device can have multiple MAC addresses, non-matching MAC addresses could correspond to the same or different devices, while a null outcome provides no information). Accordingly, in response to comparing the general identifier associated with the trial configuration item to the general identifiers associated with all existing configuration items and determining that all outcomes were either a non-match or a null, operation 240 may provide no information relating to whether the trial configuration item matches an existing configuration item or whether the trial configuration item represents a new configuration item (i.e., because both non-match and null outcomes provide no information relating to the uniqueness associated with the trial configuration item in the general identifier context).

Additionally, in response to determining that the property compared between the trial configuration item and the existing configuration item does not have the unique identifier type or the general identifier type, an operation 250 may determine whether the property has the differentiator type. As such, in response to determining that the property does not have the differentiator type, an exception may be indicated in an operation 255 (e.g., the property has an undefined type or a type that cannot be compared). Alternatively, in response to the property having the differentiator type, an operation 260 may compare the differentiator associated with the trial configuration item to any existing configuration items that have corresponding differentiators. In one implementation, if comparing the differentiator property associated with the trial configuration item to the differentiator properties associated with the existing configuration items in operation 260 results in one or more match outcomes and/or null outcomes, operation 260 may provide no information relating to the uniqueness associated with the trial configuration item. For example, if the trial configuration item has a purchase date that matches the purchase date associated with an existing configuration item, the match outcome cannot differentiate the trial configuration item from the existing configuration item because different resources could have the same purchase date, nor can a null outcome differentiate the trial configuration item from the existing configuration item. Therefore, the differentiator cannot be used to suitably distinguish whether all configuration items existing in the configuration management database are different from the trial configuration item. However, in response to operation 260 resulting in non-match outcomes with respect to all existing configuration items, an operation 265 may generate the final reconciliation conclusion to indicate that all existing configuration items are different from the trial configuration item (e.g., if the trial configuration item and all existing configuration item have different purchase dates, the existing configuration items are all different from the trial configuration item). Accordingly, in one implementation, the final reconciliation conclusion generated in operation 265 may indicate that the trial configuration item represents a new configuration item if the differentiator associated with the trial configuration item does not match the differentiator associated with any existing configuration item in the configuration management database.

In one implementation, additional details relating to the method 200 shown in FIG. 2 and described in further detail above may be provided in U.S. patent application Ser. No. 12/706,543, entitled "Configuration Item Reconciliation," filed Feb. 16, 2010, the contents of which are hereby incorporated by reference in their entirety.

Figure 3:
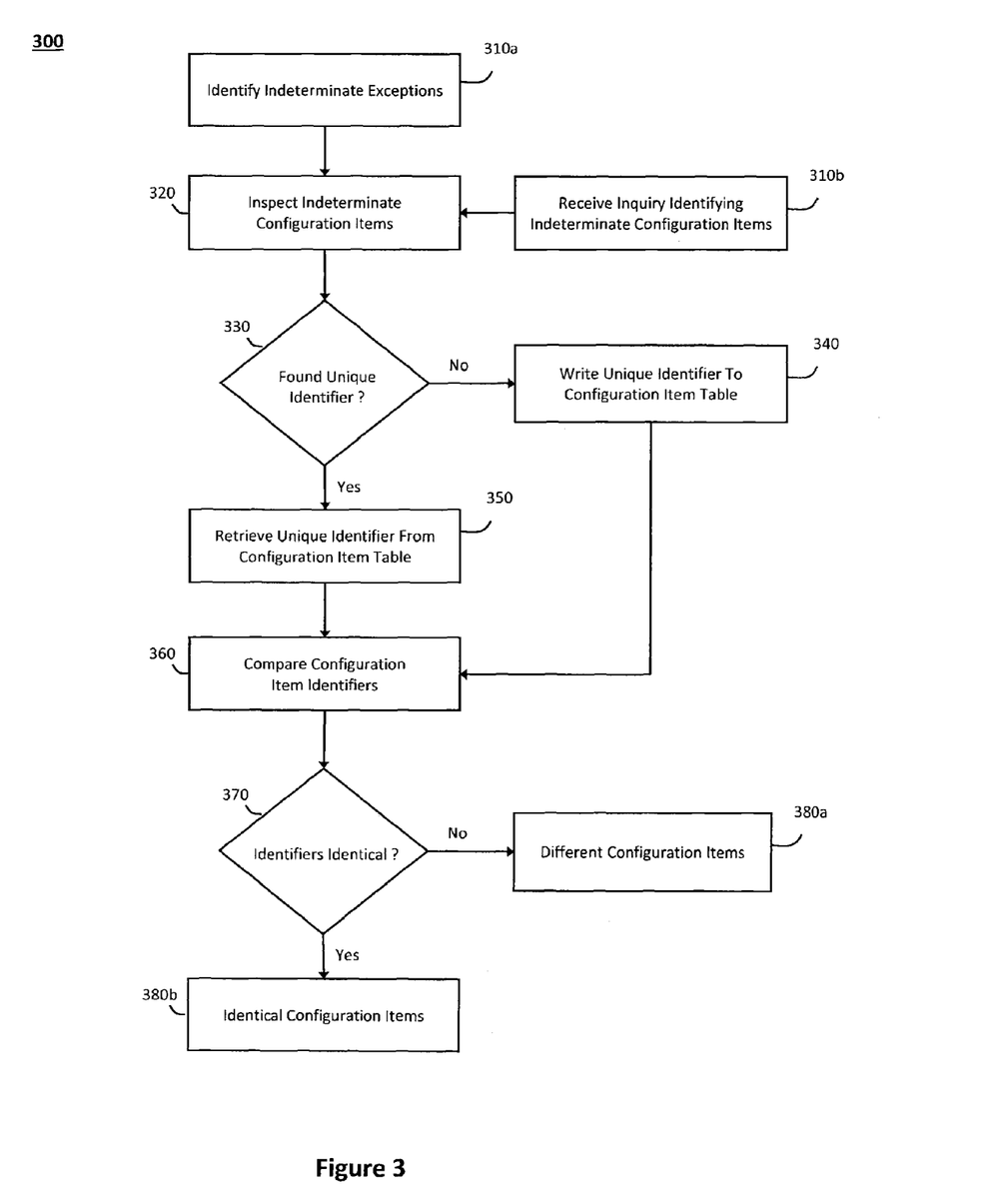
FIG. 3 illustrates an exemplary method to reconcile duplicate configuration items in a configuration management database, according to one aspect of the invention.

According to one aspect of the invention, FIG. 3 illustrates an exemplary method 300 to reconcile duplicate configuration items in a configuration management database. In particular, the method 300 illustrated in FIG. 3 may generally be invoked in response to a reconciliation engine generating an indeterminate exception relating to the uniqueness associated with a trial configuration item that a management application has requested to add to the configuration management database. For example, as noted above, the reconciliation engine may generate the indeterminate exception if a unique identifier associated with the trial configuration item results in a null comparison outcome with respect to any existing configuration item in the configuration management database (i.e., because the reconciliation engine cannot accurately distinguish whether the trial configuration item and the existing configuration item have the same or different unique identifiers). Furthermore, in one implementation, the reconciliation engine may further generate the indeterminate exception if a general identifier associated with the trial configuration item only results in non-match or null outcomes with respect to all existing configuration items, or if a differentiator identifier associated with the trial configuration item results in a match outcome or a null outcome with respect to any existing configuration item (i.e., because different resources can have the same general identifier and/or differentiator, a match outcome provides no information relating to the uniqueness associated with the trial configuration item, nor does the null outcome provide any information relating to the uniqueness associated with the trial configuration item).

Accordingly, in one implementation, an operation 310*a* may include the reconciliation engine initiating automated intervention to reconcile the uniqueness associated with the trial configuration item in response to identifying one or more indeterminate exceptions indicating that any unique identifiers, general identifiers, differentiators, or other properties associated with the trial configuration item failing to accurately distinguish whether the trial configuration item corresponds to an existing configuration item or represents a new configuration item that can be added to the configuration management database. Alternatively (or additionally), the reconciliation engine may attempt to reconcile the uniqueness associated with the trial configuration item in response to receiving a manual or automated inquiry about the identities associated with two or more configuration items in an operation 310*b*, wherein the two or more configuration items identified in operation 310*b* may include the trial configuration item and/or the existing configuration items in the configuration management database. To simplify the discussion that will be provided herein relating to the automated intervention that the reconciliation engine may initiate to distinguish the identities associated with the two or more configuration items, any subsequent references to the general term "configuration item" will be understood to refer to the trial configuration item and/or an existing configuration item.

In one implementation, in response to the reconciliation engine identifying one or more indeterminate exceptions in operation 310*a* and/or receiving an inquiry identifying two or more configuration items that are suspected duplicates or otherwise have an indeterminate status, an operation 320 may include the reconciliation engine initiating the intervention to distinguish whether the configuration items are identical or different, wherein the intervention may be initiated in operation 320 to reconcile any suitable configuration items that permit read and write services to well-defined data files associated with physical or logical resources that the configuration items represent. In particular, the reconciliation engine may define an Object Identifier (OID) that can be inserted into a table to uniquely identify a particular physical or logical resource represented with a particular configuration item, wherein the table may be stored directly on the configuration item rather than the configuration management database or another central repository that multiple management applications share. As such, in one implementation, the Object Identifier (hereinafter "CI.OID") may have a unique format that the reconciliation engine can identify to distinguish the CI.OID from identifiers that relate to other properties associated with the configuration items (e.g., the unique identifiers, general identifiers, and/or differentiators described above).

In one implementation, to distinguish whether two or more configuration items are identical or different, an operation 330 may include the reconciliation engine initially inspecting the table stored on one of the configuration items to determine whether or not the table includes a CI.OID. For example, if Management Information Base (MIB) tables are used to store the CI.OID on the configuration items, operation 330 may include the reconciliation engine using the Simple Network Management Protocol (SNMP) to remotely access data stored in the MIB table. In one implementation, in response to the reconciliation engine inspecting the table stored on the configuration item and finding an existing CI.OID in the inspected table, the reconciliation engine may retrieve the CI.OID from the inspected table in an operation 350 and determine that the retrieved CI.OID has previously been used to identify the configuration item in the federated configuration management database. Alternatively, if the reconciliation engine does not find an existing CI.OID in the inspected table, an operation 340 may include the reconciliation engine then writing a new CI.OID to the table. In one implementation, because the configuration item may still have an indeterminate status following the reconciliation engine writing the new CI.OID to the table, an operation 360 may include the reconciliation engine then inspecting the tables stored on any other configuration items to determine if the tables stored on any such configuration items match the new CI.OID.

In one implementation, operation 360 may therefore include the reconciliation engine comparing the CI.OID written to the table stored on the configuration item (in operation 340) to any CI.OIDs retrieved from the tables stored on the other configuration items, or alternatively comparing the CI.OID retrieved from the table stored on the configuration item (in operation 350) to the CI.OIDs retrieved from the tables stored on the other configuration items. As such, an operation 370 may include the reconciliation engine then determining whether the CI.OIDs compared in operation 360 are different or identical, wherein the reconciliation engine may determine that any configuration items having the same CI.OID stored in their tables are identical in an operation 380b (i.e., because the tables associated with the different configuration items are in fact the same logical table stored on the same physical or logical resource). Alternatively, an operation 380a may include the reconciliation engine determining that the configuration items are different if the configuration items do not have the same CI.OID stored in their tables (i.e., because writing the CI.OID to one configuration item would inherently result in the CI.OID written thereto appearing on any other configuration items that are in fact the same physical or logical resource).

As such, the method 300 shown in FIG. 3 and described herein may generally be used to incrementally write unique CI.OIDs to each configuration item in the configuration management database that previously had an indeterminate status, wherein the indeterminate exceptions may decrease with the number of configuration items containing a CI.OID accruing. Additionally, in one implementation, an administrator or other user having suitable authorization may manually test hypotheses about the identities associated with different configuration items using the techniques described above (e.g., submitting an inquiry that identifies two or more configuration items in operation 310b). Moreover, although not explicitly shown in FIG. 3, the CI.OIDs may be written to each and every physical or logical resource discovered during an installation associated with the configuration management database to ensure that all configuration items referenced therein can be suitably reconciled, or alternatively the CI.OIDs may be written to each and every configuration items in an existing configuration management database installation to remedy any indeterminate exceptions that may have resulted from different management applications using different mechanisms to identify the configuration items added to the configuration management database.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, the machine-readable storage medium may include read only memory, random access memory, magnetic disk storage media, optical storage media, flash memory devices, and other media for storing information. Moreover, while firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system to reconcile duplicate configuration items, the system comprising:
  a configuration management database containing an existing configuration item, wherein the existing configuration item represents a physical or logical resource in an information technology infrastructure; and
  a reconciliation engine having a processor comprising hardware, the processor configured to:
    perform a comparison between a property associated with a trial configuration item and a corresponding property associated with the existing configuration item in order to conclude whether the trial configuration item and the existing; configuration item are identical, conclude whether the trial configuration item and the existing configuration item are different, or arrive at an indeterminate outcome relating; to whether the trial configuration item and the existing configuration item are different or identical;
    generate an exception if the comparison between the property associated with the trial configuration item and the corresponding property associated with the existing configuration item results in an indeterminate outcome relating to whether the trial configuration item and the existing configuration item are different or identical; and responsive to an indeterminate outcome relating to whether the trial configuration item and the existing configuration item are different or identical, inspect a predetermined storage location at a physical or logical resource in an information technology infrastructure represented by the trial configuration item to reconcile whether the trial configuration item and the existing configuration item are different or identical and take an action responsive to a determination of whether the trial configuration item and the existing configuration item are different or identical.

2. The system of claim 1, wherein the processor associated with the reconciliation engine is configured to perform the comparison between the property associated with the trial configuration item and the corresponding property associated with the existing configuration item in response to receiving a request to add the trial configuration item to the configuration management database from a management application.

3. The system of claim 1, wherein the processor associated with the reconciliation engine is configured to perform the comparison between the property associated with the trial configuration item and the corresponding property associated with the existing configuration item in response to receiving a manual inquiry to reconcile whether the trial configuration item and the existing configuration item are different or identical.

4. The system of claim 1, wherein to reconcile whether the trial configuration item and the existing configuration item are different or identical, the processor associated with the reconciliation engine is further configured to write a unique object identifier associated with the physical or logical resource that the trial configuration item represents to the predetermined storage location associated with the trial configuration item in response to the predetermined storage location having an empty field.

5. The system of claim 4, wherein to reconcile whether the trial configuration item and the existing configuration item are different or identical and take an action responsive to a determination of whether the trial configuration item and the existing configuration item are different or identical, the processor associated with the reconciliation engine is further configured to:

inspect the predetermined storage location at the existing configuration item;

determine that the trial configuration item and the existing configuration item are identical if the predetermined storage location associated with the existing configuration item has the unique object identifier written to the predetermined storage location associated with the trial configuration item; and combine the trial configuration item with the existing configuration item in response to determining that the trial configuration item and the existing configuration item are identical.

6. The system of claim 4, wherein to reconcile whether the trial configuration item and the existing configuration item are different or identical and take an action responsive to a determination of whether the trial configuration item and the existing configuration item are different or identical, the processor associated with the reconciliation engine is further configured to:

inspect the predetermined storage location at the existing configuration item;

determine that the trial configuration item and the existing configuration item are different if the predetermined storage location associated with the existing configuration item does not have the unique object identifier written to the predetermined storage location associated with the trial configuration item; and add a new configuration item that represents the trial configuration item to the configuration management database in response to determining that the trial configuration item and the existing configuration item are different.

7. The system of claim 1, wherein to reconcile whether the trial configuration item and the existing configuration item are different or identical and take an action responsive to a determination of whether the trial configuration item and the existing configuration item are different or identical, the processor associated with the reconciliation engine is further configured to:

determine that the trial configuration item and the existing configuration item are identical if the predetermined storage location associated with the trial configuration item has a unique object identifier that represents the physical or logical resource associated with the existing configuration item; and combine the trial configuration item with the existing configuration item in response to determining that the trial configuration item and the existing configuration item are identical.

8. The system of claim 1, wherein the predetermined storage location comprises a table stored on the physical or logical resource represented by the trial configuration item.

9. A method to reconcile duplicate configuration items, the method comprising:

storing an existing configuration item in a configuration management database, wherein the existing configuration item represents a physical or logical resource in an information technology infrastructure;

comparing a property associated with a trial configuration item to a corresponding property associated with the existing configuration item on a reconciliation engine having a processor, in order to conclude whether the trial configuration item and the existing configuration item are identical, conclude whether the trial configuration item and the existing configuration item are different, or arrive at an indeterminate outcome relating to whether the trial configuration item and the existing configuration item are different or identical;

generating an exception if comparing the property associated with the trial configuration item to the corresponding property associated with the existing configuration item results in an indeterminate outcome relating to whether the trial configuration item and the existing configuration item are different or identical; and responsive to an indeterminate outcome relating; to whether the trial configuration item and the existing configuration item are different or identical, inspecting, by the reconciliation engine, a predetermined storage location at a physical or logical resource in an information technology infrastructure represented by the trial configuration item to reconcile whether the trial configuration item and the existing configuration item are different or identical and take an action responsive to a determination of whether the trial configuration item and the existing configuration item are different or identical.

10. The method of claim 9, wherein the reconciliation engine compares the property associated with the trial configuration item to the corresponding property associated with the existing configuration item in response to receiving a request to add the trial configuration item to the configuration management database from a management application.

11. The method of claim 9, wherein the reconciliation engine compares the property associated with the trial configuration item to the corresponding property associated with the existing configuration item in response to receiving a manual inquiry to reconcile whether the trial configuration item and the existing configuration item are different or identical.

12. The method of claim 9, wherein inspecting the predetermined storage location at the trial configuration item to reconcile whether the trial configuration item and the existing configuration item are different or identical comprises writing a unique object identifier associated with the physical or logical resource that the trial configuration item represents to the predetermined storage location associated with the trial configuration item in response to the predetermined storage location having an empty field.

13. The method of claim 12, wherein inspecting the predetermined storage location at the trial configuration item to reconcile whether the trial configuration item and the existing configuration item are different or identical and take an action responsive to a determination of whether the trial configuration item and the existing configuration item are different or identical further comprises:
 inspecting the predetermined storage location at the existing configuration item;
 determining that the trial configuration item and the existing configuration item are identical if the predetermined storage location associated with the existing configuration item has the unique object identifier written to the predetermined storage location associated with the trial configuration item; and
 combining the trial configuration item with the existing configuration item in response to the reconciliation engine determining that the trial configuration item and the existing configuration item are identical.

14. The method of claim 12, wherein inspecting the predetermined storage location at the trial configuration item to reconcile whether the trial configuration item and the existing configuration item are different or identical and take an action responsive to a determination of whether the trial configuration item and the existing configuration item are different or identical further comprises:
 inspecting the predetermined storage location at the existing configuration item;
 determining that the trial configuration item and the existing configuration item are different if the predetermined storage location associated with the existing configuration item does not have the unique object identifier written to the predetermined storage location associated with the trial configuration item; and
 adding a new configuration item that represents the trial configuration item to the configuration management database in response to the reconciliation engine determining that the trial configuration item and the existing configuration item are different.

15. The method of claim 9, wherein inspecting the predetermined storage location at the trial configuration item to reconcile whether the trial configuration item and the existing configuration item are different or identical and take an action responsive to a determination of whether the trial configuration item and the existing configuration item are different or identical comprises:

determining that the trial configuration item and the existing configuration item are identical if the predetermined storage location associated with the trial configuration item has a unique object identifier that represents the physical or logical resource associated with the existing configuration item; and
 combining the trial configuration item with the existing configuration item in response to the reconciliation engine determining that the trial configuration item and the existing configuration item are identical.

16. The method of claim 9, wherein the predetermined storage location comprises a table stored on the physical or logical resource represented by the trial configuration item.

17. A non-transitory computer-readable medium comprising computer-readable instructions, the computer-readable instructions when executed by a processor, causes the processor to carry out a plurality of operations, the plurality of operations comprising:
 storing an existing configuration item in a configuration management database, wherein the existing configuration item represents a physical or logical resource in an information technology infrastructure,
 comparing a property associated with a trial configuration item to a corresponding property associated with the existing configuration item on a reconciliation engine having a processor, in order to conclude whether the trial configuration item and the existing configuration item are identical, conclude whether the trial configuration item and the existing; configuration item are different, or arrive at an indeterminate outcome relating to whether the trial configuration item and the existing configuration item are different or identical;
 generating an exception if comparing the property associated with the trial configuration item to the corresponding property associated with the existing configuration item results in an indeterminate outcome relating to whether the trial configuration item and the existing configuration item are different or identical; and
 responsive to an indeterminate outcome relating; to whether the trial configuration item and the existing configuration item are different or identical, inspecting, by the reconciliation engine, a predetermined storage location at a physical or logical resource in an information technology infrastructure represented by the trial configuration item to reconcile whether the trial configuration item and the existing configuration item are different or identical and take an action responsive to a determination of whether the trial configuration item and the existing configuration item are different or identical.

18. The non-transitory computer-readable medium of claim 17, wherein the inspecting the predetermined storage location at the trial configuration item to reconcile whether the trial configuration item and the existing configuration item are different or identical comprises writing a unique object identifier associated with the physical or logical resource that the trial configuration item represents to the predetermined storage location associated with the trial configuration item in response to the predetermined storage location having an empty field.

19. The non-transitory computer-readable medium of claim 18, wherein the inspecting the predetermined storage location at the trial configuration item to reconcile whether the trial configuration item and the existing configuration item are different or identical and take an action responsive to a determination of whether the trial configuration item and the existing configuration item are different or identical further comprises:
  inspecting the predetermined storage location at the existing configuration item or the trial configuration item;
  determining that the trial configuration item and the existing configuration item are identical if the predetermined storage location associated with the existing configuration item has the unique object identifier written to the predetermined storage location associated with the trial configuration item; and
  combining the trial configuration item with the existing configuration item in response to the reconciliation engine determining that the trial configuration item and the existing configuration item are identical.

20. The non-transitory computer-readable medium of claim 18, wherein the inspecting the predetermined storage location at the trial configuration item to reconcile whether the trial configuration item and the existing configuration item are different or identical and take an action responsive to a determination of whether the trial configuration item and the existing configuration item are different or identical further comprises:
  inspecting the predetermined storage location at the existing configuration item;
  determining that the trial configuration item and the existing configuration item are different if the predetermined storage location associated with the existing Configuration item does not have the unique object identifier written to the predetermined storage location associated with the trial configuration item; and
  adding a new configuration item that represents the trial configuration item to the configuration management database in response to the reconciliation engine determining that the trial configuration item and the existing configuration item are different.

* * * * *